United States Patent [19]

Parti

[11] Patent Number: 5,680,590
[45] Date of Patent: Oct. 21, 1997

[54] SIMULATION SYSTEM AND METHOD OF USING SAME

[76] Inventor: Michael Parti, 331 Ninth St., Del Mar, Calif. 92014

[21] Appl. No.: 524,004

[22] Filed: Sep. 5, 1995

Related U.S. Application Data

[63] Continuation-in-part of Ser. No. 987,117, Dec. 4, 1992, abandoned, which is a continuation of Ser. No. 586,551, Sep. 21, 1990, abandoned.

[51] Int. Cl.$^6$ .................................................. G06F 9/455
[52] U.S. Cl. ................... 395/500; 364/578; 364/DIG. 1; 364/232.3; 364/264.3; 364/DIG. 2; 364/933.8
[58] Field of Search ....................... 395/500, 700, 395/920, 952; 364/578, 200 MS File, 232.3, 264.3, 900 MS File, 933.8; 128/697, 731

[56] References Cited

U.S. PATENT DOCUMENTS

| | | | |
|---|---|---|---|
| 5,295,491 | 3/1994 | Gevins | 128/731 |
| 5,309,919 | 5/1994 | Snell et al. | 128/697 |
| 5,339,422 | 8/1994 | Brender et al. | 395/700 |
| 5,475,624 | 12/1995 | West | 364/578 |
| 5,548,539 | 8/1996 | Vlach et al. | 364/578 |

OTHER PUBLICATIONS

"The Design of a Simulator for an Intensive Care Unit Patient Data Management System", by N. Fumai et al., IEEE, Computer-Based Medical Systems, 1990 Symposium, Jun. 1990, pp. 454–461.

"Computer Simulation of the Controlled Cardiovascular System: Application to Cardiac Assistance Evaluation", by G. Avaanzolini et al., IEEE, Computers in Cardiology, 1992, pp. 693–696.

"Animated Models for Teaching Aspects of Computer Systems Organization", by W. Henderson, IEEE Transactions on Education, vol. 37, No. 3, Aug. 1994, pp. 247–256.

"A Physiologically Valid Simulator for Training Residents to Perform an Epidural Block", by L. Hiemenz et al., IEEE, Biomedical Engineering, 1995 15th Southern Conference, Jan. 1996, pp. 170–173.

*Primary Examiner*—Kevin J. Teska
*Assistant Examiner*—Russell W. Frejd
*Attorney, Agent, or Firm*—Bernard L. Kleinke; Peter P. Scott

[57] ABSTRACT

A simulation system includes a computer, and provides a mathematical model of the entity under investigation, and includes input apparatus for supplying desired variable change information to the mathematical model. The system generates model simulation information as modified by the variable change information, and controls the changes of the model simulation information in correspondence with real time, independently of the computer used. The system includes toggling apparatus for activating and deactivating selectively desired subsystems of the mathematical model, and is arranged to adjust selectively the number of subsystems and subsystem components of the mathematical model. In addition, the system allows the user to customize the information displayed about the mathematical model while the model is running without deactivating the simulation of any activated subsystem or subsystem component. In this regard, the system enables model subsystems and subsystem components to be easily added, deleted or modified in a user friendly manner. The system further enables a user to adjust the number of displayable functional operations of the system from a maximum number indicative of all of the relevant functional operations and parameters in the simulated system to a minimum number without deactivating the simulation of any subsystem or component included in the simulation process.

20 Claims, 5 Drawing Sheets

SIMULATION SYSTEM AND METHOD OF USING SAME

CROSS-REFERENCE TO RELATED APPLICATIONS

This application is a continuation-in-part application of U.S. patent application Ser. No. 07/987,117, filed Dec. 4, 1992 and entitled "SIMULATION SYSTEM AND METHOD OF USING SAME", now abandoned, which is a continuation of U.S. application Ser. No. 07/586,551, filed Sep. 21, 1990, and entitled "SIMULATION SYSTEM AND METHOD OF USING SAME," now abandoned.

TECHNICAL FIELD

The present invention relates to a simulation system, and a method of using it. The invention more particularly relates to a computer generated physiological modeling system for modeling physiological parameters relating to living organisms.

BACKGROUND ART

Simulation, by modeling, presents many advantages for teaching and training of students and health care professionals in the study of normal and abnormal physiology in humans and other organisms. These advantages are especially valuable in teaching and training in the areas of anesthesia, physiology and other biological sciences. In the past, for many applications, the use of animals for research and teaching has been expensive, time consuming and inefficient. In addition, only small numbers of students, at any given time, can benefit from experimental work on animals. As a result, even with a large population of experimental animals available, only small groups of students can learn directly from experimental animal techniques. In addition, the physiological status of one animal will sometimes differ from that of another and, as a result, the physiological data derived from experiments on various animals, may not be reliable, in some cases.

Another disadvantage of reliance on animal experimentation for generation of physiological information, for research and teaching purposes, lies in the fact that, for human applications, the data may not be directly correlated to the physiological condition of the human. Further, societal pressures against unrestricted animal experimentation are increasing and, as a result, reliance on animal experimentation to generate physiological data, for research or teaching purposes, is not oftentimes satisfactory.

Therefore, it would be highly advantageous to have a system for use in teaching and research that would model the physiological parameters of humans and other organisms, without the necessity of reliance on experimental animals. Also, it would be highly desirable to be able to train larger numbers of persons, such as those present in a large lecture hall, at the same time.

Disciplines which could benefit significantly from a suitable physiological modeling system are anesthesia and pharmacology. In the exercise of both of these disciplines, the health, and indeed the life of the individual, is often at risk and there is very little room for error in the practice of these arts. As a result, treating of individuals in anesthesia and pharmacology is done in an individualized, highly focused and expensive manner, wherein the practitioner is exposed, over long periods of time, to the training of a more experienced person, in order to learn appropriate techniques. This, of course, is not only expensive and inefficient, it limits severely the availability of training to small groups of individuals.

Additionally, experience with relatively infrequent complications is often quite inadequate. The trainee is therefore not experienced in how to handle these difficult situations.

With this in view, it is recognized that it would be highly desirable to have a modeling system which could provide physiological data, with regard to pharmacokinetic and pharmacodynamic parameters, without the necessity of relying on living patients.

Modeling systems are known in other disciplines. For example, the cockpit simulator that is utilized in training airline pilots, has been developed to enable the pilot on the ground to learn how a particular aircraft will behave in flight. This approach, is clearly a far less expensive, and less dangerous teaching technique than it would be, if the pilot was limited to learning how to fly a very complex aircraft, only during flight.

With regard to physiological monitoring, certain systems have been developed. As an example, an anesthesia simulator-recorder has been developed by Janssen Pharmaceutica, which utilizes a personal computer to simulate responses under anesthesia. The system incorporates an integrated mathematical model of cardiovascular and respiratory physiology and pharmacology in an attempt to predict a simulated patient's minute-to-minute responses to the administration of fluid and drugs, and control of the airway and ventilation in the patient.

While such modeling systems have value, they are very limited with regard to the number of physiological parameters that can be modeled. In addition, such modeling systems are generally unable to provide variation in data organization and display to enable better understanding or demonstration of pharmacodynamic and pharmacokinetic events. In addition, conventional physiological modeling systems are unable to provide real time simulations of large numbers of physiological parameters in view of the finite time required by the modeling system computer to accomplish calculations. For example, a particular computer may be too slow, or too fast, to track with what is actually happening in the pharmacodynamic sense.

Thus, it would be highly desirable to have a physiological modeling system which could provide a real time user design of modeling data output, and which would be capable of synchronizing calculations with the actual real time occurrence changes in the model under study.

SUMMARY OF THE INVENTION

Therefore, the principal object of the present invention is to provide a new and improved simulation system and method of using it.

Another object of the present invention is to enable model subsystems to be easily added, deleted or modified in a user friendly manner during the simulation process. Another object of the present invention is to provide such a new and improved simulation system and method that enable subsystem components to be easily added, deleted during the simulation process or modified in a user friendly manner. Still yet another object of the present invention to provide such a new and improved simulation system and method that enables a user to adjust the number of displayable functional operations of the system from a maximum number indicative of all of the relevant functional operations and parameters in the simulated system to a minimum number without deactivating the simulation of any subsystem or component included in the simulation process.

Briefly, the above and further objects are realized by providing a system for simulating a desired model, in a new and improved manner.

A simulation system includes a computer, and provides a mathematical model of the entity under investigation, and includes input apparatus for supplying desired variable change information to the mathematical model. The system generates model simulation information as modified by the variable change information, and controls the changes of the model simulation information in correspondence with real time, independently of the computer used. The system includes toggling apparatus for activating and deactivating selectively desired subsystems of the mathematical model, and is arranged to adjust selectively the number of subsystems and subsystem components of the mathematical model. In addition, the system allows the user to customize the information displayed about the mathematical model while the model is running without deactivating the simulation of any activated subsystem or subsystem component. In this regard, the system enables model subsystems and subsystem components to be easily added, deleted or modified in a user friendly manner. The system further enables a user to adjust the number of displayable functional operations of the system from a maximum number indicative of all of the relevant functional operations and parameters in the simulated system to a minimum number without deactivating the simulation of any subsystem or component included in the simulation process.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

The following description is presented and organized according to the following outline:

A. HARDWARE DESCRIPTION
B. SYSTEM OVERVIEW AND OPERATION
C. SYSTEM COMPUTER SOFTWARE
D. SYSTEM SUBROUTINES
E. COMPUTER SYSTEM FEATURES
F. SYSTEM CONFIGURATIONS

A. HARDWARE DESCRIPTION

Figure 1:
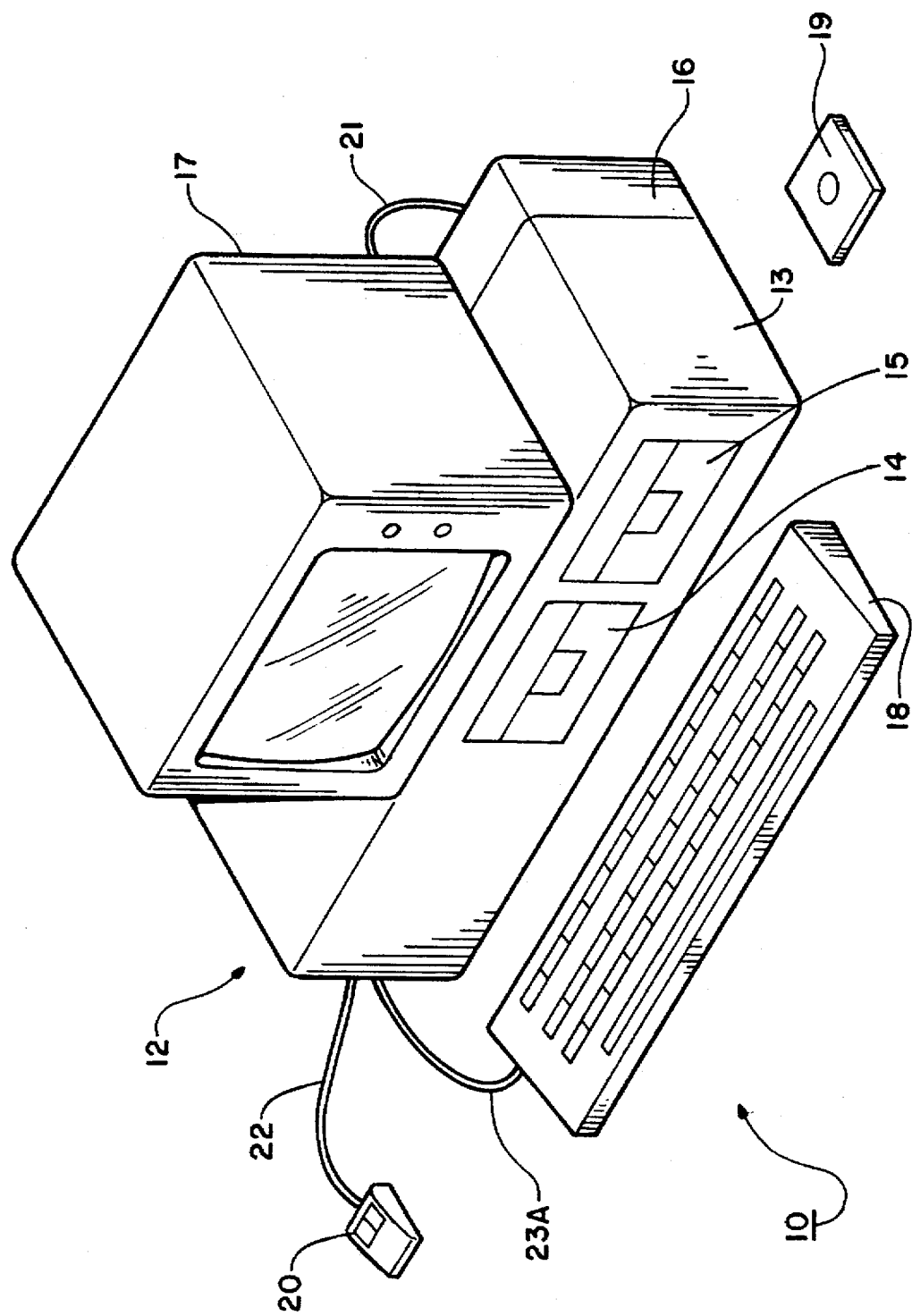
FIG. 1 is a diagrammatic view of the system of the present invention.
Figure 2:
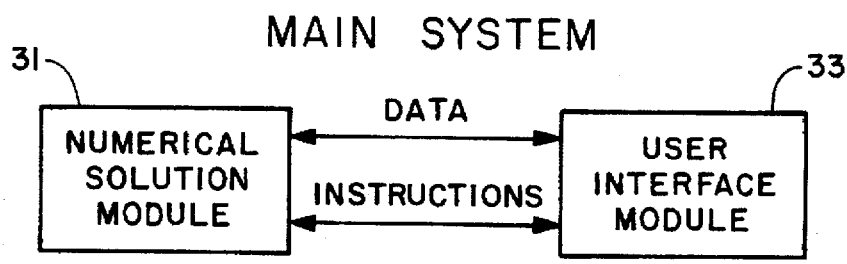
FIG. 2 is a system block diagram of the main system computer program modules of the computer program forming a part of the system of FIG. 1.

Referring now to FIG. 1 of the drawings, there is shown a model simulation system 10, which is constructed in accordance with the present invention. The system 10 includes a computer useable medium, such as a computer readable disc 19, having computer readable program code embodied thereon for causing the system 10 to simulate the functional operations of a model to be simulated, such as the model of a living organism (not shown).

The computer readable program code includes a plurality of computer readable subsystem program codes where the subsystem program codes are structured to simulate the functional operations of individual subsystems forming part of the model to be simulated. Thus, for example, the subsystems to be simulated in the living organism includes the heart, the lungs, and other organs.

Each individual one of the plurality of the subsystem models has a unique index number assigned to it where the total number of index numbers assigned define the total number of subsystem to be included in a model to be investigated. Such index numbers, as will be described in greater detail, facilitates the activation and deactivation of the individual subsystem during system simulation.

A computer readable last control loop program code can be entered by a user at the end of any one of the subsystem models. Such a last control loop code defines an ending index number that prevents temporarily any subsystem program code embodied thereafter in the medium 19 from being read for simulation purposes. The last control loop code can be moved by the system user at any time during the simulation process.

The last control loop program code causes the index numbers assigned to certain ones of the subsystem models to be renumbered sequentially commencing with a first index number and terminating with the ending index number. In this regard, any computer readable subsystem program code embodied in the medium 19 following the last control loop program code will not be included in the renumbered sequence and will not be readable by the system for system simulation purposes.

From the foregoing, it should be understood that the last control loop program code enables the user to add, delete or modify any subsystem model in a very fast and user friendly manner. Thus, different simulation models may be investigated without making massive program changes to the system 10.

In the present inventive system 10, the computer readable program codes include a set of mathematical expressions designed to simulate pulsatile cardiovascular function. The form of the model allows the transport of respiratory gases ($O_2$, $CO_2$), and drugs to the various organ compartments via the blood. There the drugs are stored based on the specific physical characteristics of the drug and the physiological characteristics of the organ. Pharmacological actions are based on the amount(s) of drug(s) present in certain organ compartments (e.g., level of anesthesia is determined by the amount of halothane in the Brain Grey Matter tissue compartment). The system 10 utilizes multiple and transport modeling strategies and incorporates augmented physiological detail and greatly enhanced tabular and graphical analytical tools.

The system 10, generally comprises a conventional personal computer 12 having a central processing unit 13, a pair of storage units 14 and 15 for storing database information and system software programs stored on the computer readable storage medium, such as the medium 19, a graphic interface module 16 for generating video signals indicative of character and graphic data, and a video monitor 17 for displaying character and graphic data in response to the video signals. The central processing unit 13 also includes an internal memory (not shown) and a mouse input device 20.

As best seen in FIG. 1, a cable 23A interconnects the processor unit 13 with an input keyboard 18 for entering data and commands in the internal memory of the central processing unit 13. A cable 21 interconnects the graphic interface module 16 with the video monitor 17, and a cable 22 interconnects the mouse device 20 to the personal computer 13.

The personal computer 12 is a conventional personal computer, such as the IBM compatible ALR 80386/33 MHZ Computer with a 640K Bytes of RAM, a 80387/33 math co-processor, a Super VGA graphic board, and a VGA high resolution display.

The user-friendly model architecture enables the user to interact with and analyze the model function in a very fast and convenient manner.

Command entries from the user are menu oriented and accomplished via the keyboard 18 or the mouse 20.

The set-up of a simulated case allows the selection from a set of "canned patients" or the user may customize a patient with special characteristics.

B. SYSTEM OVERVIEW AND OPERATION

1. OVERVIEW

The computer system 10 of the present invention is used to simulate the physiological functions and pharmacological actions of drugs in human or animal systems. The system 10 is designed to enable a broad range of applications. The intent is to use the system in lieu of a living human or animal body for teaching or research applications. A variety of medical professionals can be trained on the simulator without the potential for endangering human or wasting animal lives. This type of simulation serves to provide more uniform and broader training experiences as well as provide a means for performing hypothesis testing and experimental design in order to streamline live experimental procedures. One can use the system as a sort of flight simulator to explore infrequently occurring situations in a repeatable manner. One can also use the system to train students in such broad areas as basic physiology and such specialized areas as pulmonary function and blood gases.

The overall system is composed of two main software modules, a mathematical or numerical solution model of the body module 31 and a user interface module 33. The numerical solution module 31 solves the equations governing the interactions among the various bodily subsystem components. The user interface module 33 provides a means through which the user interacts with the mathematical module by performing actions on the simulated system for, example, drug administration, while also providing a means for displaying results of the mathematical module's calculations. Such displayed results, for example, could be the blood pressure in the aorta and drug concentration in the brain.

2. OPERATION

In operation, the first phase of the system 10 comprises a basic fact-gathering process performed under the control of a computer program executed by the central processing unit 13. The information is gathered in response to computer generated images, referred to as screens, displayed on the video monitor 17. The computer program for causing the generation of the screens, is preferably stored on a floppy disk (not shown) which is used to store the basic data.

Once the basic data regarding a subject are entered via the keyboard 18, it is stored on the same disk or in the internal memory of the central processing unit 13. In this regard, it will be understood by those skilled in the art that basic information can be gathered at a remote location and sent to the central processing unit 13 by various other techniques, such as sending by electronic messages via modems and telephone systems (not shown).

The basic information is a subject profile report including the name and age of the subject, weight, height, and other pertinent information that will enable the central processing unit 13 to prepare a profile report regarding the subject.

Once the basic information is gathered a message is sent by the central processing unit 13 for display on the monitor requesting the user to input appropriate variable parameters that may or may not affect the physiological responses of the subject.

Figure 5:
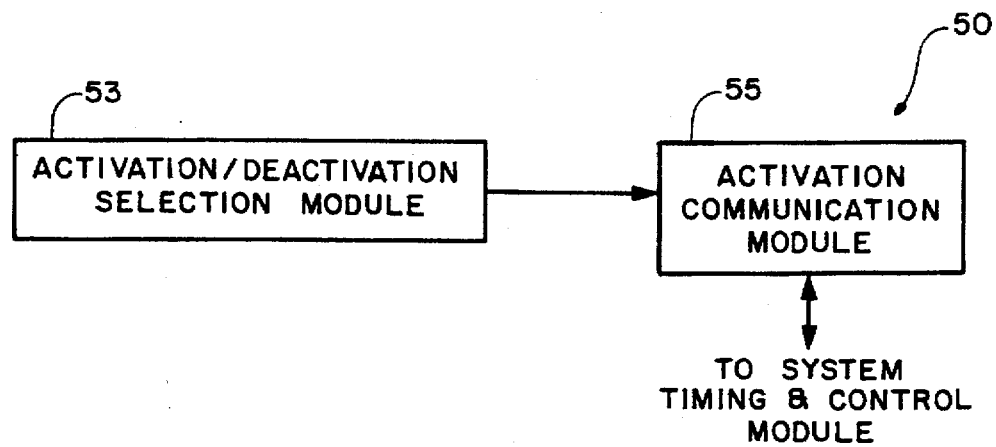
Figure 6:
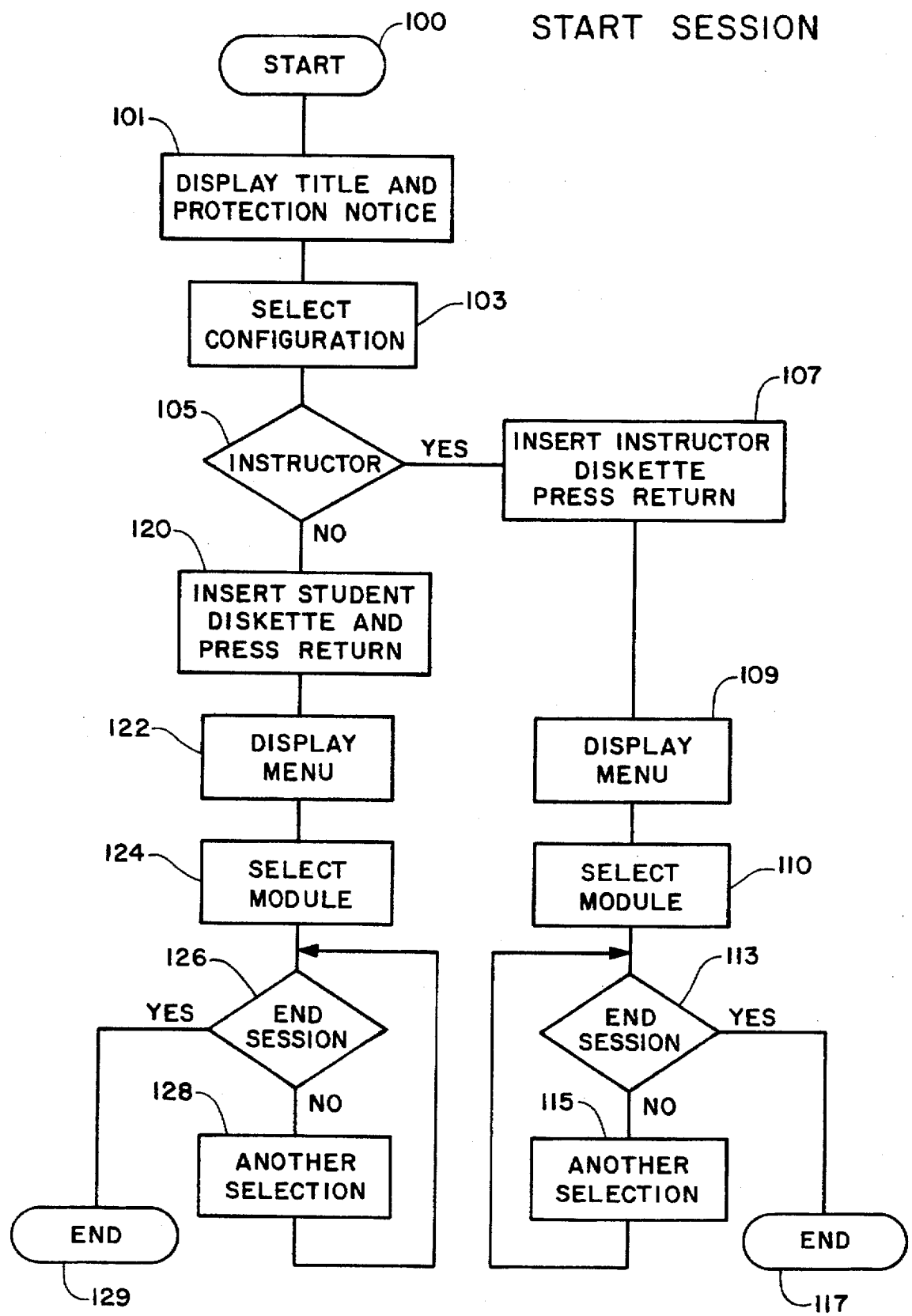
FIG. 6 is a flow chart of the overall system operation.

Considering now the activation communication subroutine module 55 in greater detail with reference to FIG. 5, the activation communication module 55 communicates with the numerical simulation module 31 regarding which modes are currently active.

The Activation Communication Module 55 communicates the current user selection to the Numerical Solution Module 31 in the overall system defined above. Each submodule in that Numerical Module 31 regularly polls a data structure generated by module 55 in order to decide what is the currently appropriate procedure.

As a very simple example, let us assume that the user is a student who is trying to understand the control of mean arterial pressure in the body. In the short term, this pressure is affected by the baroreceptor loops, the renin-angiotensin loop and by some drugs. (of course it is also affected by things like hypovolemia and systemic anomalies). Suppose the student is interested in the effects of baroreceptors, renin-angiotensin and a single vasodilator and a single vasoconstrictor.

There are very many combinations of these effects which could be observed. The student may decide to turn off all of the regulatory mechanisms and then turn them on one at a time, with a fixed drug admission protocol. Alternatively, the student may wish to let the system stabilize with all regulation loops intact and then turn them off one at a time to see the effect of each. Of course, it may be necessary to administer a vasodilator or a vasoconstrictor in order to push the mean arterial pressure off the nominal value and then observe the effects of turning on and off the regulatory mechanisms.

From this screen, the user would then perform the entire anesthetization including drug introduction, intubation and ventilation. During the entire process, the numerical module would be accepting user interventions, continually computing all appropriate variable values and delivering results to the screen according to the instructions of the user.

Considering now the on-line activation/deactivation of system mechanisms module 50 in greater detail with reference to FIG. 5, the module 50 includes two subroutine modules, an activation/deactivation selection module 53 and an activation communication module 55.

The on-line activation/deactivation of systems and mechanism module 50 allows a user to determine and/or demonstrate significance and actions of the many physiological functions and control mechanisms employed in the model. Module 50 is useful for both analyses, understanding disease processes, and teaching.

Example of Use

As an example of its use, imagine that a student in anesthesiology wishes to learn how to put a patient to sleep. First, the student would select the patient to be anesthetized by setting a variety of patient characteristics within the user interface module. For example, the student would choose the patient's sex, weight, percent body fat, age, and existing preconditions. For example, the patient may have emphysema, coronary artery disease etc. Finally, the student would choose the procedure to be performed on the patient after anesthetization (e.g. coronary artery bypass graft). Once the patient has been specified, the student would then specify the drugs to be used in the anesthetization procedure. For example, the student may wish to learn how to use thiopental and halothane. The student would then call up the subject display module which provides a series of life sign monitors, a ventilator and a choice of intravenous drips and airways.

From this screen, the user would then perform the entire anesthetization including drug introduction, intubation and ventilation. During the entire process, the numerical module would be accepting user interventions, continually computing all appropriate variable values and delivering results to the screen according to the instructions of the student.

B. USER INTERFACE MODULE

As the user interacts with the video display, the information displayed comes directly from the computed values of the variables contained in the model. The patient appearance provides some information about his condition (i.e., skin color: such as cyconotic from hypoxia, eyes-open or closed, twitch response). User inputs (i.e., I-V drugs, respiratory gases) are fed directly into the model and affect the behavior of the model. These interactions are managed by mouse 'point-and-push' selections, or keyboard entries.

The user interface module 33 enables the user to observe the state of the model at any time and to effect changes in the simulation by performing simulated actions such as injecting a drug. This interface is accomplished by a series of graphic displays which represent either a physically based depiction of what the model is simulating, a set of tables and graphs which display the numerical variable computed by the model, and displays which allow the user to make changes to the characteristics of the model or input data.

The display interface is segmented into a simulated operation room (OR) cartoon display, and an analysis framework of tables and graphs.

OPERATING ROOM DISPLAY

The simulated O-R includes:
- The Patient
- I-V solutions
- Injectable drugs
- Airway selection
- Anesthesia machine & ventilator DIGITAL MONITORS (Spirometer, $FIO_2$, Pulse Oximeter, End-tidal $CO_2$, Mean Arterial Pressure, Mean CVP, Systolic/Diastolic pressures and Heart Rate)

WAVEFORM DISPLAYS (Arterial Pressure, PA Pressure, CVP, ECG)

- Laboratory Data
- Control of surgery

ANALYTICAL DISPLAY

The analytical displays provide a very useful and attractive tabular and graphic display of the values of most of the variables contained in the model. Any four of these variables can be plotted against time (over one beat or breath) simultaneously. They can also be plotted against one another (e.g., flow vs. pressure).

CIRCULATORY VARIABLES displayed for each circulatory compartment include:
- Volume of blood
- Pressure
- Blood flow
- Capacitance RESPIRATORY VARIABLES displayed for the respiratory system include:
- Air volumes
- Air flows
- Airway resistance
- Airway capacitances Some variables are saved for display of compartment behaviors over a long period of time (Long-Term plots). These plots include:
- Heart Rate
- Central Venous Pressure
- Stroke Volume
- Cardiac Output
- Systematic Vascular Resistance

C. SYSTEM COMPUTER SOFTWARE

Referring now to FIGS. 2 through 7, there is shown set of a flowcharts of the computer software for the system 10 as applied to a typical physiological model, such as a physiological model for teaching students how a body functions and reacts to certain stimuli or anesthetics.

The computer system 10 is started with a presentation of software stored on a diskette (not shown) using conventional program loading techniques. Once the main program has been loaded into the users computer 12, operation commences at box 100.

Considering now the operation of the system 10 in greater detail, operation starts in box 100 and commences to instruction box 101 where the program causes a title and protection notice to be displayed on the video monitor 17. When the user is finished viewing the title and legal protection notice, which includes a message to press a return key on the keyboard 18 to start the program, the user presses the return key and the program advances to box 103.

At box 103 the user is prompted to select either the instructor configuration or the training configuration and then press the return key. After he enters the configuration selection and presses the return key, the program advances to decision box 105. If the user selected the instructor configuration, the program goes to instruction box 107 and causes a message to be displayed on the monitor 17 instructing the user to insert an instructor program diskette in the disk memory unit 14 and press the return key. If the training configuration was selected, the program advances to instruction 120 and causes a message to be displayed on the monitor 17 instructing the user to insert a student diskette in the disk memory unit 14 and press the return key.

If the instructor diskette is inserted, the program advances to instruction 109 which causes a menu to be displayed. The program then advances to instruction 110 and prompts the user to select a module. The module is then executed and the results displayed. The program then advances to decision box 113 and prompts the user to indicate whether the sessions has not ended, the program advances to instruction 115 prompting the user to make another module selection. The program then returns to decision box 113 and continues as previously described. If the session is to be ended, the program advances from box 113 to box 117 which ends the session.

If the student diskette is inserted, the program advances to instruction 122 which causes a menu to be displayed. The program then advances to instruction box 124 and prompts the user to select a module. The module is then executed and the results displayed for the student. The program then advances to decision box 126 and prompts the user to indicate whether the session is ended. If not ended, the program advances to instruction 128 prompting the student to make another module selection. The program then returns to decision box 126 and continues as previously described. If the session is to end, the program advances from box 126 to box 129 which ends the session.

D. SYSTEM SUBROUTINES

1. SUBJECT DISPLAY MODULE

As an example of its use, imagine that a student in anesthesiology wishes to learn how to put a patient to sleep.

First, the user would select the patient to be anesthetized by setting a variety of patient characteristics within the user interface module. For example, the user would choose the patients, sex weight, percent body fat, age, and existing preconditions. For example, the patent may have emphysema, coronary artery disease etc. Finally, the user would choose the procedure to be performed on the patient after anesthetization (e.g., coronary artery bypass graft). Once the patient has been specified, the user would then specify the drugs to be used in the anesthetization procedure. For example, the user may wish to learn how to use thiopental and halothane. The user will then call up the patient display module which provides a series of life sign monitors, a ventilator and a choice of IV solutions and airways.

From this screen, the user would then perform the entire anesthetization including drug introduction, intubation and ventilation. During the entire process, the mathematical module would be accepting user interventions, continually computing all appropriate variable values and delivering results to the screen according to the instructions of the user.

As an example, in some cases, users may be particularly interested in pulmonary function and only desire a summary view of the rest of the body. In other cases, the user may be a novice anesthesia student only interested in overall summary variables like end tidal CO2, percent O2 saturation etc. In still other cases, the user may want to look at long term plots of a variety of variables like acid base variables in the muscles, fat and brain.

The solution proposed in this patent application is to provide an interface module structured in such a way that the user can easily configure the display at any time in any desired format with display of only those variables of interest at the time. Furthermore, formats for the screens of interest can be stored on disk for retrieval by name. Each user would then have at their disposal a collection of previously defined displays for use at any time in their particular application interest areas.

In order to appreciate the importance of this capability, it is necessary to keep two situations in mind. First, the processes being simulated are exceedingly complex with very many variables simultaneously evolving over time. Second, there is a human operator with a specific set of goals in mind and a specific mindset in terms of organization of the theory involved in the problem under simulation. The challenge is to make the channel of communication between the human and the simulation as efficient as possible. Since the human is in charge, it is logical to give the user the ability to decide and change at will the type of information being displayed, while the program is running, and the format in which it is displayed.

This intimacy between the user and the simulation leads to much faster learning on the part of the human and much better detection of anomalies in the simulation performance.

Of course, the search for excellent communication between user and computer is not limited to simulations of the type concretely described here. This ability to give the user complete and facile control over the output of a computer algorithm will fundamentally accelerate progress in a number of important computer intensive avenues of enquiry like fluid dynamics, heat transfer etc.

A second issue is that of traffic control in displays. Here, we refer to the user's ability to control the speed of evolution of the data being displayed. To be effective, this speed control must be instantly available to the user and, at a minimum, must include the ability to freeze the simulation in order to carefully study the tabular data on various screens and the ability to step through the simulation one step at a time. The module in this patent application requires a single keystroke or mouse click to freeze or to enter step action mode. In the latter, the simulation is advanced one step each time a key is depressed or the mouse is clicked.

2. NUMERICAL SOLUTION MODULE

The numerical module 31 is of the general class of models called a physiological pharmacokinetic model, combined with functions of transport of multiple components. The transported components would include: 1) physiological factors, such as hemoglobin in the blood or air (oxygen+ carbon dioxide+nitrogen) through air passages into the lungs; and 2) effector agents, such as drugs being carried by the blood to the various organs where stored or where certain drug effects occur.

The module 31 is subdivided into subsystem components arranged in a combination of series, parallel, and tangential elements which mimic the actual organization in the real physiological system. These components of this compartmental model are shared by all mammalian systems with some species and individual variations. The cardiovascular system is the "heart" of the model. It allows the distribution of blood and blood borne agents to the organs of the body where many of the various simulated actions occur. The cardiovascular system is driven by a pulsated heart. Since this is a closed system, the description of the components will begin at an arbitrary point, the venous side of the circulation. The vascular compartments are 1) vena cava; (in series with) 2) right heart (right ventricle); (in series with) 3) the pulmonarete the circuit, y arteries (left and right in parallel); (maintaining segregation between the left and right pulmonary circulations in parallel) 4) the pulmonary capillaries (left and right); (in series with) 5) the pulmonary veins (left and right); (in series with and rejoining at the) 6) left heart (left ventricle); (in series with) 7) aorta for the proximal organ distribution (in series with) 8) distal (leg) arteries for the distal organ distribution; (with all of the organ compartments branching in parallel off of the two arterial compartments into the) 9) grey matter of the brain; 10) white matter of the brain; 11) myocardium (heart muscle); 12) muscle and skin (combined); 13) splanchnic organs (stomach, intestines, pancreas, spleen, liver); 14) kidney; and 15) other slowly perfused organs (fat, bone, connective tissue, etc.) All of the organ compartments "empty" into separate venous compartments for each organ subsystem (in parallel) and then are combined once again in the vena cava to complete the cycle.

The simulated blood is numerically transported around this circuit using typical equations describing conductance of electrical current or fluids. Each vascular compartment has a defined capacitance which determines the pressure in that compartment as a function of the volume of blood instantaneously present in a compartment. The pressure differentials between sequential or parallel compartments combined with the resistances to flow between compartments determines the magnitude and direction of blood flow just as in the real physiological system. Therefore each compartment maintains a dynamic balance of blood flow from the compartment(s) preceding it in the scheme and out to the compartment(s) following it in the circulatory scheme. In addition to these connected blood compartments, there are separate organ tissue compartments and the system of air-containing compartments in the lungs (left and right). Just as in a real system, the blood carries its various fractions with this fluid flow around to the organs. The fractions (or components) which can be carried or transported by the blood include red blood cells, electrolytes and other chemical components (i.e. sodium, potassium, chloride, bicarbonate, oxygen, carbon dioxide, proteins, and $H^+$), hormones, and drugs. These blood components interact with the organs and/or air compartments in the lungs. Some of the components of the blood can bind other substances with high affinity and increase the amount which can be carried in the blood. Examples of these binding substances included in this model are hemoglobin and plasma proteins. Hemoglobin binds oxygen, carbon dioxide, and $H^+$ ion, whereas plasma proteins can bind drugs to varying degrees, depending on the specific drug. The binding affinity of hemoglobin and plasma proteins can be affected by computed physiological factors, such as blood pH, the presence of modifiers to hemoglobin oxygen affinity, such as 2,3-DPG, or by the presence of other drugs, such as competitive drug binding to proteins.

The lungs (or lung compartments) are subdivided into the left and right lungs. The sequential compartments, beginning with the mouth are: 1) mouth and trachea; (in series with) 2) bronchi (left and right, in parallel); (in series with) 3) bronchioles and small airways (left and right in parallel); (in series with) 4) alveoli (left and right in parallel). Although the air moves through the airways in a series and parallel fashion similar to the flow of blood in the vascular compartments, the alveoli (left and right) are functionally and numerically tangential to the circulatory system at the point of the pulmonary capillaries (left and right). The air in the lungs contains major amounts of nitrogen, oxygen, and carbon dioxide. This air can also carry relatively small amounts of other gas vapors, such as inhaled anesthetics, or other gases, such as xenon. The sequential airway compartments interact with each other as the air passes through (alternating bidirectional flow) causing mixing. The airway is either open to the outside world at the mouth (open system) or it can be semi-closed by the imposition of a ventilator which can force the air flow. The air is only tangentially connected to the circulation through the alveoli/pulmonary capillaries (left and right), which is where all of the simulated exchange processes occur. It is necessary to distinguish the "tangential" components from the other parallel and series components of the circulatory system. A tangential component is one which is connected to the periphery of the circulatory system, but is not actually within the stream of flow. Examples of tangential components are the actual organ compartments (separate from the blood compartment which flows through the organ) and the air in the alveoli of the lungs (discussed above). These tangential sites represent the simulated capillaries of the body where the circulatory/end organ interactions occur. Since the lungs represent either an open or a semi-closed system, gradients between the alveoli and the pulmonary capillaries are dependent on the characteristics of external (to the cardiovascular system) gas concentrations and on the rate of turnover of air in the alveoli (ventilation). The organs can represent tangential sites of closed system storage of components, such as drugs, or semi-open system effects of metabolism, such as drug deactivation by the liver or the respiratory conversion of oxygen to carbon dioxide by the cells comprising the organs.

The organ subsystems have some common features. Transfers of components carried by the blood are determined by a concentration gradient from the blood to the tangential organ compartments. Oxygen is taken up and carbon dioxide released by the organ as a function of the metabolic requirements of the tissue and the oxygen availability in the blood. Electrolytes may be exchanged with the blood dependent on changes in conditions in the blood and organs. Drugs which are circulated by the blood may be stored in the organ tissue compartment or released from the tissue to the blood, if the reverse gradient exists. The rate of storage in (or release from) the tissues depends on any limitations to passage through membranes. The maximal amount of drug which can be stored is dependent on the relative solubilities of the drug in water and fat (or lipid). A measure of this relative solubility is the blood/tissue partition coefficient. The amount of relatively fat soluble drugs which can be stored in the organ tissues is more dependent on the amount of fat in the tissue. The amount of relatively water soluble drugs which can be stored in the organ tissues is more dependent on tissue water content. The amount of drug delivered to the tissue, and therefore available for storage in the tissue is dependent on the blood flow to the compartment and the amount or concentration of the drug contained in that blood. Each organ compartment has different drug storage characteristics (different specific values for these parameters) determined by measurements in laboratory experiments. The combination of drug distribution by the blood, uptake by the organs, and elimination by single or combinations of mechanisms describes the pharmacokinetic behavior of a drug.

In addition to the physical distribution of the drugs as described above, the effects of the drugs on the various components of the system are determined by dose-response relationships for specific sites of action, such as the blood or brain tissue. The combination of the physical properties of pharmacokinetics with the dose-response relationships yields the overall pharmacodynamic characterization of a drug.

In addition to the compartmental organization of the model, there is a parallel and separate nervous system which operates much the same way as a real nervous system. This system senses the state or condition of certain parameters and makes a change in the system. An example is the mean systolic pressure in the aorta. If the pressure is lower than a predetermined "setpoint," the system uses an algorithm to increase the heart rate. If the difference cannot be maintained by minor adjustments in heart rate, there may also be increases in resistance to blood flow into some of the organ systems. There may also be a change (decrease) in compliance of some components of the venous system. These various responses to altered blood pressure are implemented by feedback control loops, are non-linear, and unevenly applied to the various organ subsystems. Overall, feedback control sensors include arterial pressure, venous pressure, arterial oxygen content, arterial pH, and arterial carbon dioxide content. These sensors feed information to an integrated control algorithm for each reflex which controls parameters such as respiratory rate, tidal volume, heart rate, stroke volume, and venous compliance.

The computations which comprise the numerical model are performed using iterative and closed form solution techniques to solve a system of differential and algebraic equations. The state of the model is recomputed at regular time intervals. Thus, at any point in time the state of the system is defined by a computed assignment of values to every variable within the system. The overall design of the system allows the user to turn on or off many of the physiological components of the system. Examples of mechanisms which can be on-off manipulated include gas exchange between the alveoli and blood, organ metabolism, blood pressure control loops, transport of drugs, actions of drugs, etc. These manipulations can be accomplished by a special screen displayed by a keystroke as an easy to use part of the user interface. Many other components of the numerical system which are displayed by the user interface can also control features or parameters of the model, such as physical characteristics of a drug, the compliance of a vascular compartment, or resistance to blood flow into an organ.

Due to the many detailed components of the subsystems of the model, a variety of disease conditions can also be simulated. Examples of these disease conditions would be heart failure, emphysema, or anemia. The separation of components, such as red blood cells from plasma, also allows an adequate means of simulating a wide variety of treatment modalities in addition to drugs. Examples of these variations in treatments would be the administration of blood components, such as packed red blood cells or whole blood or normal saline solution, or alteration of inspired gas mixtures.

Although the system 10 in the preferred embodiment includes only those features described, a variety of enhancements of the model would be known by one skilled in the art. Such enhancements include an embellishment of physiological function; an increase in the variety of patient selection; additional drugs selections of various types; and enlarged I-V fluid selection; an improved analytical capabilities.

3. USER INTERFACE MODULE

Figure 4:
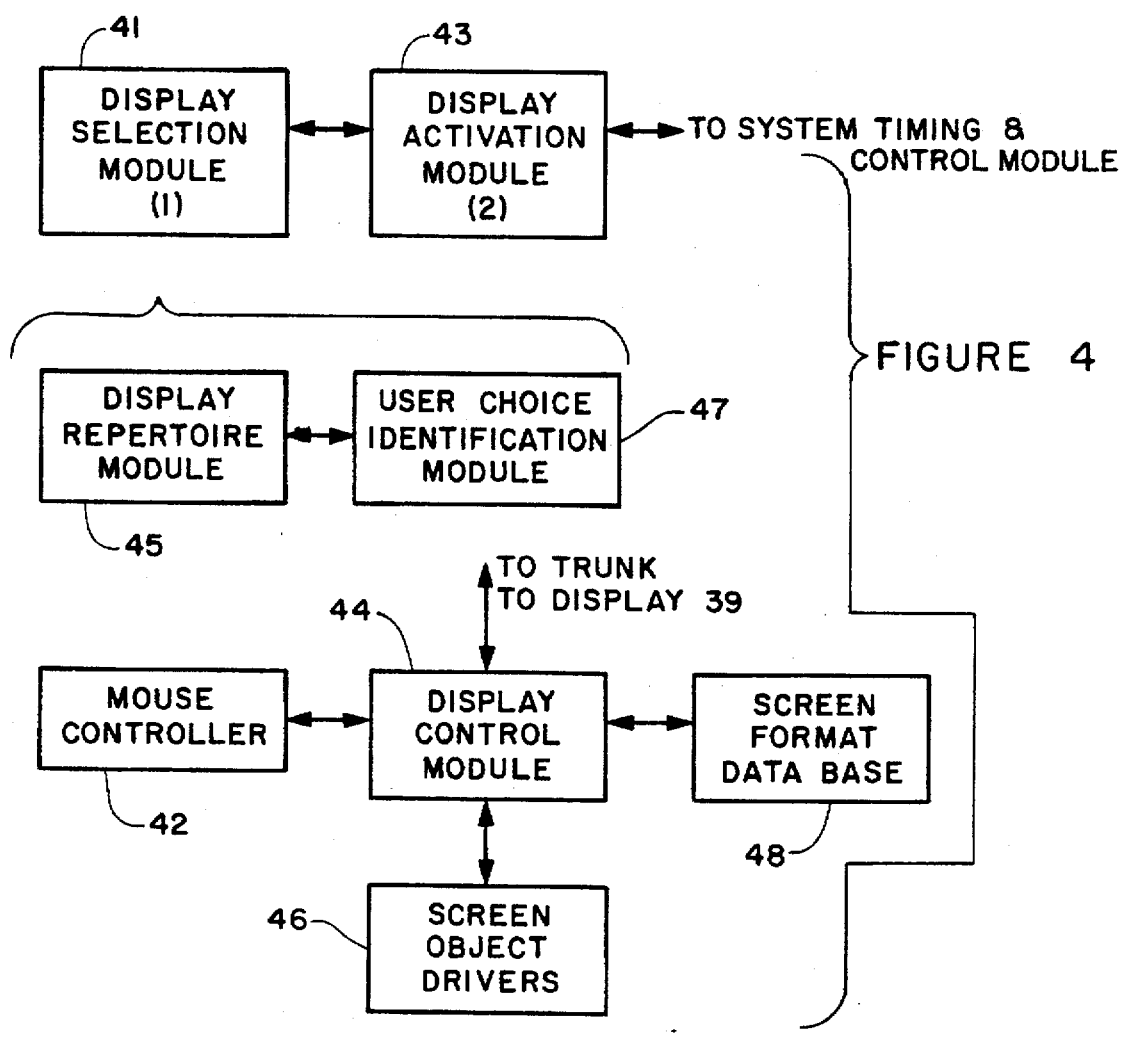

Considering now the user module 33 in greater detail with reference to FIG. 4, the user interface module 33 allows a user to individualize the output displays that will be displayed on the monitor 17. In this regard, different purposes and user bias can require variation in data organization and display to better understand or demonstrate the many detailed characteristics of the model simulation.

As best seen in FIG. 4, the user interface module includes two subroutine modules, the display selection subroutine module 41 and the display activation subroutine module 43. These form part of the user interface module 33 specified above. The user interface module also includes a set of submodules including a mouse controller module 42, a display control module 44, a screen object drivers module 46 and a screen format data base module 48. Each of these modules will be described hereinafter in greater detail.

The user interface module 33 enables the user to have maximum freedom in choosing (and/or change) the data being displayed. There is quite a bit of complexity involved in these choices. One must choose what data (if any) to display in tabular form on the screen. A user must choose what data are to be graphed and in what format. For example, a user could choose pie charts for distributional information, bar charts, time plots or x-y plots. The latter are plots in which both the horizontal and vertical axes correspond to non-time variables (e.g. left ventricular pressure vs left ventricular volume). Typically, a user may wish the time and X-Y plots to have more than one curve (e.g. all heart pressures simultaneously vs time).

Finally, a user may wish to choose time plots over a variety of time scales. For example, the above mentioned pressure-flow plots tend to be most meaningful over a single heartbeat. However, respiratory equivalents are more meaningful over a single breath, while many interesting control variables and those related to drug action are best seen over comparatively long times (minutes to hours). The display architecture described herein provides capabilities in all of these areas.

Considering now the display selection subroutine module 41 in greater detail with reference to FIG. 4, the Display Selection subroutine 44 includes a Display Repertoire subroutine module 45, and a User Choice 1 data function subroutine module 47. The Display Repertoire, subroutine module 45, includes the building blocks for the various display objects in the display interface. These blocks comprise both data and subroutines necessary for the actual on-screen display generation. Note that there are two kinds of data involved: the data associated with the display object itself (e.g. titles, size of window, colors etc.) and the actual data being displayed (e.g. pressures, flows, concentrations). The latter, of course are generated in the numerical module 31 of the total system described above. The display objects in the display repertoire subroutine module 45 include routines for tables, pie charts, bar charts, time plots and x-y plots, all of which are capable of displaying many variables simultaneously.

Considering now the user choice identification subroutine module 47 in greater detail, the user choice identification subroutine module 45, contains the routines for providing an efficient means for the user to choose data to be displayed along with the type of display desired. There are basically two approaches. One can display tables of data chosen from a menu and then choose plots of any variables so displayed. Alternatively, a user choose variables to be displayed by pointing with the mouse to suggestive areas on a display screen (without a menu) and then indicating the kinds of plots desired. For example, in many applications envisioned herein, one of the hard-wired display screens is a kind of cartoon of the actual subject environment including a depiction of the subject and a variety of appropriate equipment, e.g. monitors and perhaps a ventilator. The user is permitted to select variables for display by pointing to the appropriate place on the cartoon and following a simple selection procedure.

Considering now the display activation subroutine module 43 in greater detail with reference to FIG. 4, the display activation subroutine module 43 obtains data from the Numerical Solution Module 31 and combines it with selections made by the user choice identification module 47 and actually puts the chosen displayed information on the screen using routines and information from the display repertoire subroutine module 45.

In operation, the user interface module 33 permits a user to monitor the experiment described in the example discussed below in the section on real time activation/deactivation. In particular, assume that the user is a student trying to understand the control of mean arterial pressure in the body. In the short term, this pressure is affected by the bar or receptor loops, the renin-angiotensin loop some drugs hypovolemia and systemic anomalies). Suppose the student is interested in the effects of baroreceptors, renin-angiotensin and a single vasodilator and a single vasoconstrictor.

There are very many combinations of these effects which could be observed. The student may decide to turn off all of the regulatory mechanisms and then turn them on one at a time, with a fixed drug admission protocol. Alternatively, the student may wish to let the system stabilize with all regulation loops intact and then turn them off one at a time to see the effect of each. Of course, it may be necessary to administer a vasodilator or a vasoconstrictor in order to push the mean arterial pressure off the nominal value and then observe the effects of turning on and off the regulatory mechanisms.

In terms of the display, the student may wish to concentrate on cardiovascular variables such as pressures and flows in the artery and venous compartments (aorta, peripheral arteries, and all organ compartments). Depending on whether the drugs being used are direct effectors or operate through the autonomic nervous system, the user may choose to display drug concentrations in the blood or in the brain in order to note the effect of drugs on the pressure.

Of course, the user would also probably choose to monitor mean arterial pressure, systemic vascular resistance, total blood volume and perhaps cardiac output, heart rate and stroke volume. Once having chosen the variables to be displayed, the user then selects the kind of display to be used. Some of the variables (e.g. mean arterial pressure, systemic vascular resistance and heart rate) may be desired in tabular form. The user may wish long range plots of these variables as well as the drug concentrations. Short term (beat to beat) plots may be appropriate for the aortic and venous compartment pressures. An alternate mode available to the user is to simply make a table including all of the important data and then use the mouse to select which variables are to be included in which plots.

Considering now the mouse controller module 42 in greater detail with reference to FIG. 4, the mouse controller module 42, handles all mouse functions.

Considering now the display control module 44 in greater detail with reference to FIG. 4. The display control module, performs traffic control to interleave requests for action from the user and determine the need to update information displayed on the screen.

Considering now the screen object drivers module 46 in greater detail with reference to FIG. 4, the screen object drivers module 46, contains all drivers for objects to be displayed on the screen.

Considering now the screen format data base module 48 in greater detail with reference to FIG. 4, the screen format data base module 48 contains all data pertinent to objects to be drawn on the screen. It also contains information relevant to the user's current preferences regarding what data is currently of interest and should be displayed.

An important feature of this architecture is that having been selected, plots need only be on the screen when the user wishes to consult them. If the user so desires, the plots remain on the screen. If, for example, the user wishes to consult some other information display while the long-term plots are accumulating, the plot can be removed with a keystroke or a mouse click and then repositioned with a second keystroke or mouse click.

4. NUMERICAL MODULE

Figure 3:
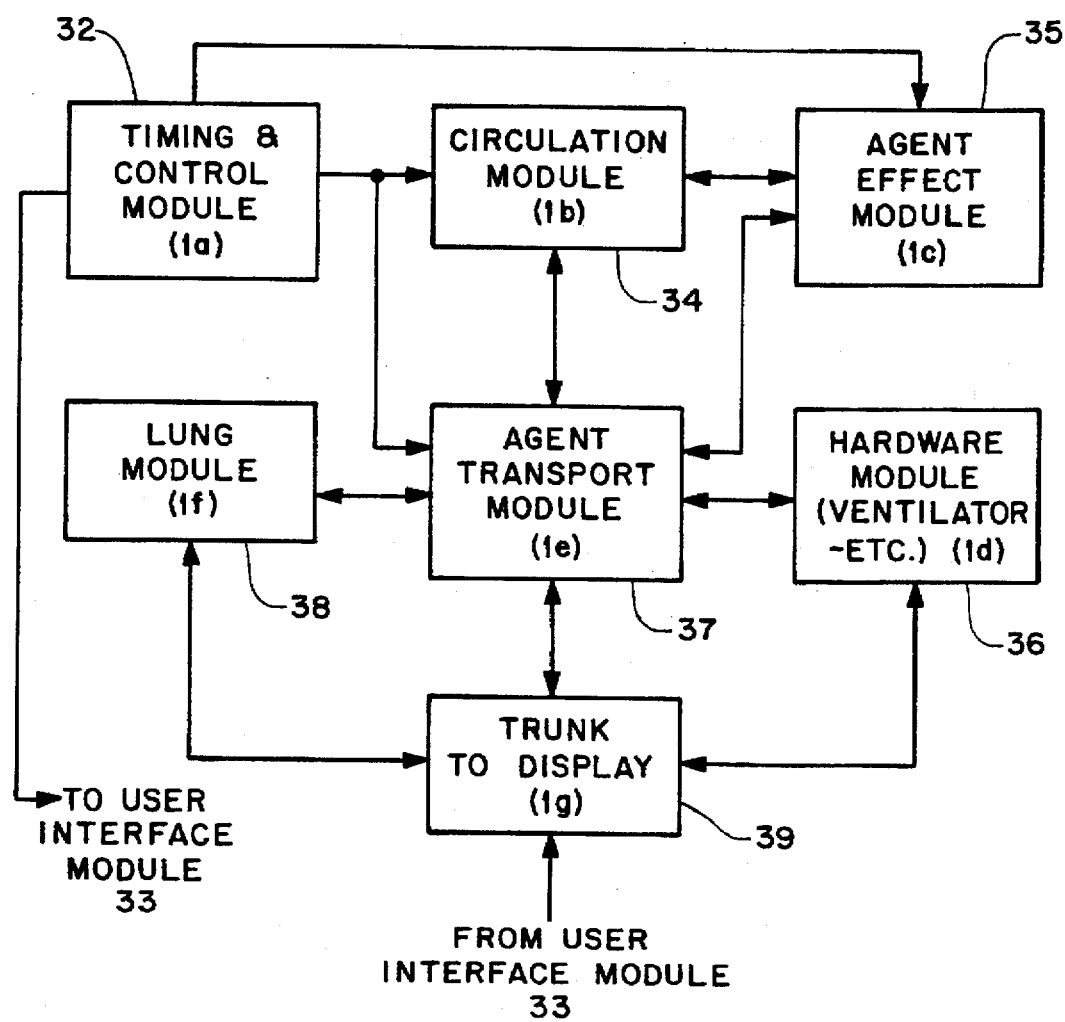
FIGS. 3, 4 and 5 are diagrams of the computer program of FIG. 2, and are useful in understanding the present invention.

Considering now the numerical solution module 31 in greater detail with reference to FIG. 3, the numerical solution module 31 includes seven submodules: a timing and control module 32, a circulation module 34, an agent effect module 35, a hardware module 36, an agent transport module 37, a lung module 38 and a trunk to display module 39. Each of these submodules will be described hereinafter in greater detail.

Considering now the timing and control module 32 in greater detail with reference to FIG. 3, the timing and control module 32 is responsible for traffic control of the entire system. It determines when it is appropriate to perform each computation made by the simulation.

Considering now the circulation module 34 in greater detail with reference to FIG. 3, the circulation module 34 computes blood circulation around the system. It updates all of the relevant pressures, flows and quantities.

Considering now the agent effect module 35 in greater detail with reference to FIG. 3, the agent effect module 35 computes the effect on all systems of all agents present in the body being simulated.

Considering now the hardware module 36 in greater detail with reference to FIG. 3, the hardware module 36 simulates any required hardware attached to the body being simulated. For example, if the simulation pertains to anesthesia, the hardware module would contain a ventilator.

Considering now the agent transport module 37 in greater detail with reference to FIG. 3, the agent transport module 37, computes the flow of all agents contained in the blood. This includes standard elements such as $O_2$ and $CO_2$ as well as any injected or inhaled agents.

Considering now the lung module 38 in greater detail with reference to FIG. 3 the lung module 38, computes the flow of all gases into and out of the lungs.

Considering now the trunk to display module 39 in greater detail with reference to FIG. 3, the trunk to display module 39 is the channel between the numerical solution module and the interface module. This is a bidirectional channel.

5. ON-LINE ACTIVATION/DEACTIVATION

In a training environment, it is extremely instructive to be able to select and change on the fly which systems are currently activated and which functional forms are currently being used in the various simulation modules.

The module under discussion in this section is designed to make such switching very simple to accomplish.

There are two major sub-modules in this subsystem, the Activation/Deactivation selection module 53 and the Activation/Communication Module 55.

Figure 7:
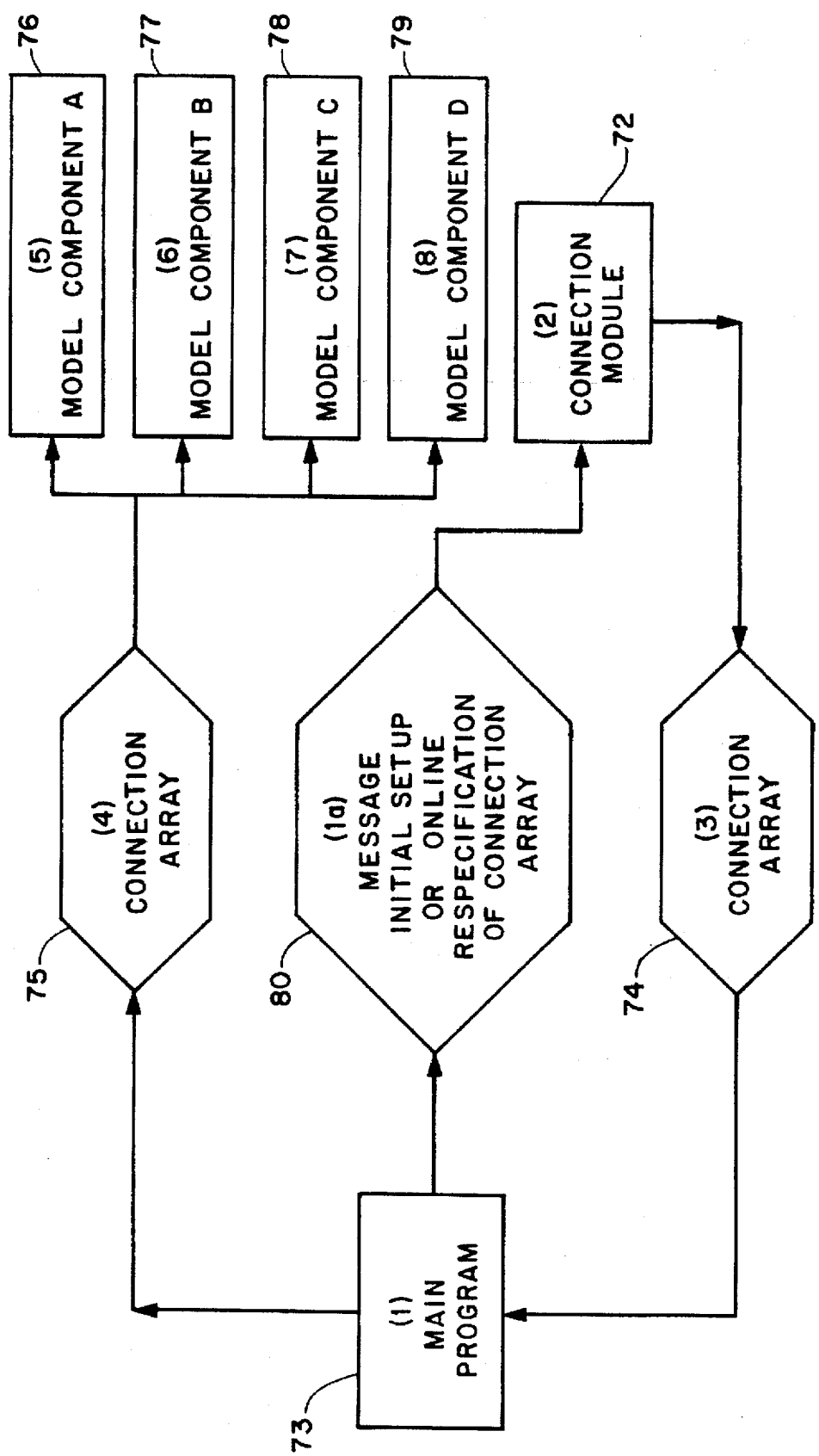
FIG. 7 is a flow chart of the operation of the connection module with the main system program.

Considering now the activation/deactivation selection subroutine module 53 in greater detail with reference to FIG. 7, the activation/deactivation selection module 53 gives the user the ability to select which modes are to be active for the next period of the simulation. It is assumed that a given set of choices will be in force until the user decides to change them.

The activation/deactivation selection module 53 contains a set of all available options which can be made active or inactive. These include virtually all of the physiological/pharmacological subsystems and effects as well as a variety of choices of approaches to simulating particular subsystems. There is a rudimentary editor which permits the user to see the current values and change any the user deserves. The entire display is called with either a mouse click or a keystroke.

6. THE CONNECTION MODULE

Considering now the connection module 72 in greater detail, the connection module 72 functions to keep track of the connections among all the components of the model. As we increase or decrease the number of body elements that are modeled, the connection module allows the system to automatically to keep track of the details of regularly occurring mechanisms for which the model must account.

This means that the connection module 72 greatly decreases the cost (time) required for improving the model (increasing its complexity) or for simplifying the model to customize it for less sophisticated markets. The importance of the scheme may be seen if we consider the alternatives.

1) The Alternatives:

In characterizing a large system, such as a human or animal body, it is possible to describe the operation of each component as a special case. For example, we might think about computing the blood pressure, volume and flow in the right ventricle and then the blood pressure, volume and flow in the aorta. In performing such calculations, the values calculated for one body location tend to depend on the outcome of calculations performed in a preceding (upstream) location.

If these values are all treated as special cases, any change in the number of body model components considered would require a large amount of work to make sure that all references to a preceding location's value pointed to the correct location. This would impede development of the model and would even make simplifications of the model for alternative markets quite difficult and prone to error.

Another alternative would be to construct separate fixed indexes for all the model variables. In this case, any change in the complexity of the model would require any reference to a particular index to be changed to a new value. Since there can be hundreds of references to such indices, such an approach is very costly and error prone.

By contrast, the connection module provides a central place for keeping track of all connections and sequences in the model so that decisions about the sequences of all types of events in the model can be made conveniently with minimal risk of introducing errors. This means that changes in the number of model components or changes in the number of connections from a particular model component, or other special-case changes in the order of execution can be handled quickly and with minimal possibility for error. In fact, the connection module can even be invoked on line, while the program is running, to allow the program to simplify itself for running on slow machines.

2) How the Connection Module Fits into the Overall System:

Considering now the operation of the connection module 72 with reference to FIG. 7, the system 10 includes a main program 73 that must make decisions about where execution is to take place. During an initialization phase, the main program 73 calls the connection module 72 which sets up an initial model connection array 74 which is passed back to the main program 73. The main program 73 uses a second model connection array 75 to decide which model component to execute next.

3) Typical Operation as an Example:

For example, our model may originally consist of model components A, B and C. Model component A 76 might represent the blood flow, pressure and volume calculations for the vena cava, model component B 77 might represent the corresponding calculations for the heart, and model component C 78 might represent the corresponding calculations for the aorta. The model must decide which to execute next.

If the complexity of the model is increased by adding the corresponding calculations for the pulmonary blood vessels 79, it is a simple matter to change the connection module to take account of the fact that the modules would have to be executed in a different order. Alternatively, during the operation of the program, the main module may detect that the current machine is operating too slowly for the fully detailed model to operate in real time. In this case, a message 80 can be sent to the connection module to disconnect some of the components of the module to speed the model's execution.

One of the defining characteristics of a physiological/ pharmacological simulation model is the extremely high degree of interaction among the subcomponents. There is a large variety of physical systems at work. For example, the lungs, circulatory system, metabolism and associated control loops all play major roles in acid/base balance. There is a large variety of effects (e.g. Bohr, Haldane etc.) which contribute significantly to bodily function.

There are also many different levels of complexity which could be used to carry out the simulation of a particular action within the body. For example, myocardial depression, venous compliance and arterial resistance might be components of an overall drug effect. Furthermore, there are various functional forms ranging from simple to highly complex which can be used to compute problems such as agent equilibria or the combined effect of several drugs.

Finally, one might wish to select from a variety of initial conditions e.g. homogeneous (all components at nominal arterial values) or all compartments set at nominal values for an elderly 90 pound woman. One might even wish to switch to fetal hemoglobin or some proportion of abnormal hemoglobin (of which there are several (e.g. thalassemia, sickle cell) to see what the effect might be.

E. COMPUTER SYSTEM FEATURES

The system's features facilitate the construction of computer simulation programs by aiding in the connection and activation of the components of the computer program. This type of feature is used to automate the activation or deactivation of various components of the program, to facilitate changes in the level of detail in each component of the program; and to facilitate changes in the level of detail in the display of information used by the model or generated by the model. The following pages contain a general discussion of these issues. After this, a more concrete discussion is of each of these features is presented along with examples from the source code in appendix A of the patent application.

General Discussion of Features

Referring now to FIG. 1, the present inventive system 10 is adapted for use as either a training tool for helping a user to better understand the interactive operating functions of the various bodily organs and systems in a living organism or alternately as a physician's aid for patient treatment such as in the administration of drugs during the course of patient care.

As will be explained hereinafter in greater detail, the system 10 facilitates the construction of computer simulation programs by aiding in the connection and activation of the subsystems or components of the various bodily organs and systems in the living organism. In this regard, the structure of the system 10 automates the activation or deactivation of the various subsystems and components embodying the modeling of the living organism, to facilitate changes in the level of detail in each subsystem or component; and to facilitate changes in the level of detail in the display of information used by the system and generated by the system relative to the living organism model.

By way of example, the following is an anesthesiology example, and will help illustrate the operation of the system 10. It should be emphasized however, the following is merely an example and not a limitation of the principles of system operations.

As best seen in FIG. 7, the system 10 generally includes a plurality of models of components which simulate the functions of the various organs of a living organism. Subsystems comprise a set of components, and may include, for example, a detailed heart model, a general model of the circulatory subsystem, and others. Such subsystems or components are prepared by a constructor based upon information provided by one or more knowledgeable medical persons.

The preparation of such models is not a static occurrence, nor is such preparation limited necessarily to one model only for any given bodily function. In this regard, the function of certain organs and subsystems in a living body may be viewed differently by those skilled in the art. Thus, one skilled practitioner may adopt one physiological model while another equally skilled practitioner may adopt an entirely different physical model for the identical organ or subsystem.

In addition to such model differences, information regarding the function of organs and systems is such to change. Thus, the components or subsystems of any given model may change based on newly acquired information.

The present inventive system 10 accommodates within the simulation of the function of a living organism in its totality both the capability of activation and deactivating of different models for the same bodily organ or subsystem as well as the ability to add, delete or substitute components within any given subsystem model or whole subsystems, in a very convenient and user friendly manner.

In one mode of operation, the system 10 can be used as a training tool, so that a user may desire to understand the physiological functions in a hypothetical living organism when a certain treatment such as a particular anesthetic or muscle relaxant is administered during an operation procedure on a hypothetical or average patient. In another mode of operation, the system 10 is used with an actual living patient undergoing treatment, when an anesthesiologist may desire to confirm the effect of treatments on the patient prior to the actual administration of such drugs.

In the later case, the patient could be connected to the system 10 via conventional patient monitoring equipment to provide actual patient read out data, while in the former case, readouts would be based on average patient data for a hypothetical patient and expected outcomes derived therefrom.

The user interface module 33 enables the user to observe the state of the model at any time and to effect changes in the simulation by performing simulated actions such as injecting a drug. This interface is accomplished by a series of graphic displays which represent either a physically based depiction of what the model is simulating, such as eyes opened, closed or dilated, a twitch response and other types of physical responses as well as a set of tables and graphs which display the numerical variables computed by the model and displays which allow the user to make changes to the characteristics of the model or input data. Thus, for example, to determine the effect of a given anesthetic, a small video image syringe with selectable graduations thereon is selected by either a student or physician as the case may be. The video image of the syringe is indicative of a given anesthetic to be administered to the patient, while the graduations represent selectable dosages that can be administered.

The user, using the mouse 20, first selects the desired anesthetic. As no anesthetic has yet been administered, the displayed video image of the patient depicts a reclined patient with alert, wide open eyes.

The initial dosage is administered by dragging the video image indicative of the syringe plunger to the first displayed graduation position. The initial dosage is deliberately selected to be of such an insufficient volume that only a dilation effect will be observed in the patient. In this regard, responsive to the modeling of the administration of the drug, the system 10 causes the video image of the patient to indicate the results of the administration of the drug. The patient image, however, remains indicative of a patient that is awake.

The student or physician at this stage may observe the heat rate, blood flow, and other various functions within the patient. The baroreceptors models within the circulatory model detect the dilation of the modeled blood vessels and the decrease in blood pressure. Responsive to such changes, the models cause the heart rate to increase to accommodate the dilation in the blood vessels.

As the initial dosage was insufficient to anesthetize the patient, the student or physician increases the dosages selected and drags the syringe plunger to administer a larger dosage. Responsive to the larger dosage, the video image of the eyes of the patient are seen to close indicating the dosage was sufficiently large to cause the patient to be anesthetized.

The student or physician may then view, via the display monitor 17, the effect of the anesthetic in the modeled bodily functions.

In actual patient care, the physician after observing the effect on the modeled patient can then prepare a dosage according to the model and administer the drug to the actual patient with a high degree of confidence that the dosage will achieve its desired effect.

In a typical surgical procedures, the next step to be performed would be to intubate the patient by inserting an air passage tube into the larynx, for example, for the administration of gases. In inserting such a tube, however, the muscles of the patient must be sufficiently relaxed to avoid constriction.

The student or physician then selects a video image indicative of a muscle relaxant and in a manner similar to administering the anesthetic, administers a small quantity of the relaxant.

Responsive to the relaxant, the video image indicative facial muscles of the patient demonstrate a slight "twitching" action. The student then selects a video image indicative of an air passage tube and moves the tube to the mouth of the video image patient for insertion. However, as the dosage was too small, the tube image is unable to enter the imaginary video larynx image. The student or physician responds to such observation by selecting a larger relaxant dosage and administers it to the hypothetical patient.

The physician or student now observes the cessation of the "twitching" as illustrated in the video image. Insertion of the tube is again attempted. In this case, the muscles are now sufficiently relaxed and the tube moves smoothly into the mouth demonstrating successful intubulation.

Again with an actual patient, the physician can administer the dosage from the model to the actual patient with a high degree of confidence that intubulation will be successful.

In the teaching aid mode of operation, it is possible, as will be explained in greater detail, to deactivate a given subsystem model of the whole simulated organism to observe the effect. Thus, the whole model illustrates the function of the loss of one of the subsystems to illustrate its function in the living organism. This is one of the major advantages of the present inventive system in that one or more subsystems comprising the whole of the living organism model can be activated or deactivated for teaching purposes.

The above mentioned activating/deactivation feature also allows a programmer constructor to isolate model subsystems or components thereof for debugging or fault finding purposes.

Still another feature or advantage of the use of the system 10 is to enable either a student user or programmer constructor to add, delete, or modify model subsystems or components in a very fast and user friendly manner. Thus, if the student wants to observe functions under conflicting theories, individual model subsystems can be toggled in and out of the whole model to enable comparisons of different versions of the same subsystem or component thereof on the overall simulated body system.

Still yet another feature or advantage of the system 10 is the activation or deactivation of portions of the display. In this regard, the display screen is capable of displaying massive amounts of information. The present inventive system enables any portion of the display to be deactivated, without deactivating the functioning of the model subsystem or component generating the information, for display purposes. This allows all of the selected information to be processed, but only those portions of interest to be displayed.

The system 10 is established to default to the maximum amount of displayable information. Thus, the user can select portions to be deactivated by simply setting a zero to those subsystems or components within the display programming loop. These displays are deactivated but the subsystem or components continue to function allowing simplification of readout information.

The flexibility of the system 10 enables it to be altered without the requirement of extensive new programming. The system 10 is thus readily adjustable as knowledge of the functions of body subsystems and components changes or grows. Also, such ease in adding, deleting or modifying subsystems or components within the whole of the model is important to find and isolate malfunctions of the system. Thus, if a problem develops in the system 10, a programmer instructor user can easily determine if data are causing an observed model malfunction or whether a particular part of the model is malfunctioning or whether interactions involving two or more parts of the model is malfunctioning to cause an aberration.

The above mentioned features and advantages of the system 10, will now be described in greater detail.

The first feature relates to the ability of the program user or the programmer/modeler or constructor to alter the general character of the work performed by the program. In this case, the issue is the ease with which the general components of the program can be activated or deactivated for the convenience of the user or programmer/modeler. For example, in the case of a physiological model, the user may desire to see how the blood flow and pressure in the body respond to external changes, from a drug, in the presence and absence of one of the body's blood pressure control systems. If one of the effects of a drug is to induce the blood vessels to dilate, this will tend to lower the blood pressure. The baroreceptor response will then serve to increase the heart rate and a number of other consequences will also follow. It should be stressed that the use of the baroreceptor portion of the simulation system is illustrated solely as an example and the same principle can be applied to any of the general simulation system components.

Using this example then, the programmer of the model may desire to observe its performance with and without the baroreceptor portion of the module in order to facilitate the isolation of any errors in the system's treatment of effects in the baroreceptor portion of the computer simulation model or in the portion of the model apart from the baroreceptor portion of the model. This type of comparison of the models performance with and without various components of the model provides the user and model constructor with a very convenient process for understanding the total performance of the model and the role of each of the components. The connection feature of the system 10 is used to facilitate such model performance comparison with and without various components of the model. An important aspect of this feature is that it allows the activation of general model components singly or in groups.

A further use of this feature of the program to the system's programmers, is that this connection/activation feature facilitates experimentation with alternative versions of the components of the model. Alternative versions of the model components may arise in a situation in which scientific opinions differ on the action of a particular component of the model. Alternative versions of a model component also may arise in a situation in which there may be different approaches to programming a particular process. In such cases, the connection/activation feature of the system 10 can be used to facilitate the investigation of the performance of the alternative versions of the model components. Using this approach, it might be found that one scientific approach to simulating a particular model component leads to nonsensical performance of the model as a whole; whereas, an alternative scientific approach may lead to well-behaved model performance. Such considerations are one tool in the assessment of the merits among alternative scientific bases that can be used by the constructors of the system. Again, using this approach, it might be found that one programming approach to a given process is more efficient or accurate than another programming approach to the same process. The connection/activation feature helps in such cases by facilitating the comparison of speed and accuracy between or among alternative programming approaches.

The connection/activation feature of the system 10 is also useful to a user of the system. In this regard, the user may desire to observe model performance with and without the activation of particular portions of the model in order to facilitate an understanding of role of any particular portion of the model's components in the determination of the model performance as a whole. Again, using the baroreceptor example, the user may desire to isolate the baroreceptor role in assessing the effect of a blood pressure drug. Note that such an approach can be useful to students or professionals seeking to understand the behavior of a simulated system, as well as designers of agents that are intended to alter the performance of the system. As noted in connection with the discussion of the usefulness of this feature to programmers, the connection/activation feature of the model is used to facilitate this type of model performance comparison with and without various components of the model. Also, as in the case of the programmers of the model, an important aspect of this feature is that it allows the activation of general model components singly or in groups.

The second feature of the connection/activation aspect of the system 10 relates to the ability of the programmer to alter the level of detail of the model. This is an important issue since the programmer may begin with a relatively simple version of the model and then wish to expand its level of detail of the model. Alternatively, the programmer/modeler may wish to diminish the complexity of the model to trace the source of possible anomalies, or to enhance the speed of the model when information on certain details are less important.

The connection/activation feature facilitates the expansion or contraction of the model details by automating the change in index numbers that are used to invoke similar processes.

For example, if the model contains a simulation of a circulatory subsystem, the programmer may wish to compute blood pressures and blood flows for each component of this portion of the whole subsystem. In initial versions of the circulatory flow, however, the programmer/modeler may include only a simple two-compartment model of the heart. In later versions, however, the programmer/modeler may wish to expand the detail of the model to include many more computations of blood flow and pressure in various portions of the heart. In such a case, the programmer must be able to expand the number of areas in which the pressures and flows are calculated and keep track of the sequence of such calculations. If this procedure is not facilitated, the programmer will necessarily need to keep track of a very large set of identifying indices for the components of the system. Using the connection/activation feature of the system, these identifying indices are changed automatically when the level of detail of the system is changed by the programmer/modeler.

A further aspect of the connection/activation feature relates to the presentation of information that is used by the system 10 or generated by the system 10. During the construction of a model, the programmer/modeler frequently requires monitoring of the information used as input to the model and to examine the information that flows from it. During this procedure, the programmer/modeler generally desires to limit the display to the active information currently processed by the system. Thus, if the programmer/modeler is altering the detail of the model, it is useful to alter the display of information automatically so that all the relevant detail of the current model is displayed but that no excess, unused portions of the system output is displayed. Using the connection/activation feature of the system 10, the display of information can be set up to change automatically when the level of detail of the system is changed by the programmer/modeler.

Feature Examples

Consider an example of the first aspect of the connection/activation feature of the system: The ability of the program/user or the programmer/modeler to alter the general character of the work performed by the program. As noted above, the issue is the ease with which the general components of the program can be activated or deactivated for the convenience of the user or programmer/modeler.

The present system 10 automates the change in the identifiers for the processes whenever a process is added or subtracted from the model. Referring now to Appendix A, not printed in this specification but a copy of which is retained in the original file wrapper, a number of looping processes that are to be executed within the model are indicated in the line entries following the "enum control__loop") command. In this regard, the items following the "enum control__loop" command is a list of the subsystem components selected by the user/constructor as being of interest, using the inventive technique. This listing, it should be understood, is a setup for the convenience of the constructor.

At the end of the subsystem list is a "last control loop" command. The last control loop command determines the number of looping processes to be simulated. In this example, the number of loops is set at "LastControlLoop," or the number "9." In the C programming language the "enum" construct automatically numbers these processes starting at zero and ending at "LastControlLoop" so that no further programming is necessary. This, however, is only one way of achieving this result. If the number of elements in this list were increased by adding a new element, or decreased, not merely to de-activate it, by subtracting one of the existing elements, the number of the final element is changed automatically.

As another example of the "last control loop" command, an array is declared whose last element is numbered, "LastControlLoop." Thus, any addition or subtraction of a component of this list would cause the last element of this list to be renumbered automatically and the number of elements in the array would be changed accordingly.

In summary, a control command is used as an index as the last item of the list. In this manner, components or whole subsystems can be added, or deleted in a convenient manner, without requiring the necessity of programming entries to recompile the list.

In Appendix A it can be seen that the Baro (baroreceptor) control loop is executed only if the element of the array "control.CONNECT[Baro]" exceeds zero. This array is initialized and the "Baro" element of the array is set to one. Note that if this array element is set to zero by the program user or the program programmer/modeler the baroreceptor control loop will be removed from the system. In this case, the system simulation can be observed with and without the effect of the baroreceptor control loop. Again, in this particular example, the user or programmer/modeler may be particularly interested in the operation of the system with and without the baroreceptor loop if a drug is administered. Thus, the connection/activation feature can be used to assess the performance and role of any of the system's components. For example, two different but similar subsystems can be toggled or clicked on to be alternatingly taken in and out of the simulation model.

Now consider an example of the second aspect of the connection/activation feature of the system: The ability of the programmer to alter the level of detail of the system. As noted above, the issue is the ease with which the details of the general components of the system can be expanded for the convenience of the programmer/modeler so that he or she will find it easier to increase the complexity of the system to obtain more greater accuracy, or to facilitate the tracing of model anomalies by simplifying the system's components.

The inventive process is to automate the change in the identifiers for the details of a process by adding one or more components when a process detail is added or subtracted. Referring now to Appendix A, a particular implementation of this process is illustrated, wherein a number of locations in the circulatory system that are the sites at which various quantities such as blood volumes and flows are computed. For example, starting with the command "Right Heart." The identifying indices for these are set, as in the previous case, in the context of an "enum" construct. In this example, the locations in the circulatory system is set at "LastCircLoc."

As noted above, in the C programming language the 'enum' construct automatically numbers these processes starting at zero and ending at the end-of-list control command "LastCircLoc" so that no further programming is necessary. It should be stressed, however, that this is only one way of achieving this result, and that the process can be carried out in manners other than this particular implementation. If the number of elements in this list were increased by adding a new element, or decreased by subtracting one of the existing elements, note that the number of the final element would be changed automatically.

The following is an example of how to use less than all of the available components of the circulatory system. A "for" loop is executed for all the elements of the circulatory system for the circulatory system locations from the identifier "RightHeart" to the identifier "VenaCava." In the course of this loop, the blood volumes for each of the circulatory system positions between and including these locations are computed. Furthermore, if the number of locations is increased or decreased by adding to or subtracting from the circulatory system location list of Appendix A, the blood volume calculations would be carried out only for the currently active locations. In this case, the model simulation can be observed with varying levels of detail. Thus, the connection/activation feature can be used to facilitate changes in the level of detail of any of the system's components. For example, a given component can be removed or replaced with a similar alternative component of a more detailed version.

Considering now an example of the third aspect of the connection/activation feature of the system: The ability of the programmer to alter the level of detail of the system information displayed. As noted above, the issue is the ease with which the display of information on the systems inputs and outputs can be customized to the current details of the system.

Referring now to Appendix A, a set of upper and lower limits for a display loop are set using the circulatory system locations. Thus, if the number of locations is increased or decreased by adding to or subtracting from the circulatory system location list, the circulatory system information display would be carried out only for the currently active locations. For example, referring to the "CircTable=Current Table", the two entries Upper Limit=VenaCava and Lower Limit=Right Heart indicate the upper and lower limits. This adjusts the amount of information being displayed, or controlling the display of alternative information. In this case, the system simulation could be observed with varying levels of detail.

F. SYSTEM CONFIGURATIONS

Note that there are two general configurations for this system. The first is one in which there is no instructor. In this configuration, the user is totally in charge of specifying the entire process to be undertaken. In the second configuration, an instructor sets up a problem to be simulated and, in the network version, is constantly watching the progress of the student and making changes in the problem by introducing events like an airway disconnect or some physiological problem like malignant hyperthermia.

Source Code

A complete copy of the source code for implementing the programs described herein is attached to the original file wrapper as Appendix A and is incorporated herein by reference.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method of simulation, comprising:

receiving information relating to a model simulation;

storing on a computer readable medium computer readable program code means for causing computer means to simulate the functional operations of said model simulation;

said computer readable program code means including a plurality of computer readable subsystem code means each indicative of a functional operation of an individual subsystem forming part of said model simulation;

each individual one of said plurality of computer readable subsystem program code means having a unique index number assigned thereto for defining the total number of subsystems forming said model simulation and for helping to facilitate the activation and deactivation of the individual subsystems during said model simulation;

one of said computer readable subsystem program code means further including computer readable last control loop program code means for defining an end index number to prevent temporarily said computer means from reading any subsystem program code means embodied thereafter in said medium; and causing the index number assigned to each computer readable subsystem program code means to be renumbered sequentially commencing with a first index number and terminating with said end index number so that any computer readable subsystem program code means embodied in said medium following said last control loop program code means will not be included in the renumbered sequence and will not be readable by said computer means for model simulation purposes.

2. A method of simulation according to claim 1, wherein each individual one of said plurality of computer readable subsystem program code means includes a plurality of computer readable component program code means each indicative of a component functional operation to be simulated and forming part of its corresponding subsystem;

each individual one of said plurality of computer readable component program code mans having a unique site number assigned thereto for defining the total number of components forming a corresponding subsystem to be simulated and for helping to facilitate the activation and deactivation of the individual components within the corresponding subsystem during model simulation;

one of said computer readable component program code means further including computer readable last component program code means for defining a last site number to prevent temporarily said computer means from reading any component code means embodied thereafter in said medium; and said last component program code means defining the number of components to be simulated within each individual one of said subsystem during any given simulation.

3. A simulation method according to claim 1, further comprising:

determining a specific system model to be simulated;

and wherein said step of determining includes activating and deactivating selectively a user selectable number of subsystems.

4. A simulation method according to claim 3, wherein said step of activating selectively a user selectable number of subsystems includes activating and deactivating selectively a user selectable number of components forming part of said subsystem.

5. A simulation method according to claim 4, wherein the steps of activating and deactivating selectively a user selectable number of components includes adding at least one new component to the total number of components previously defining the corresponding subsystem.

6. A simulation method according to claim 4, wherein the steps of activating and deactivating selectively a user selectable number of components includes deleting at least one component from the total number of components previously defining the corresponding subsystem.

7. A simulation method according to claim 4, wherein the step of activating and deactivating a user selectable number of components includes modifying at least one component of those components previously defining the corresponding subsystem.

8. A simulation method according to claim 3, wherein the steps of activating and deactivating selectively a user selectable number of subsystems includes adding at least one new subsystem to the total number of subsystems previously defining the corresponding model simulation.

9. A simulation method according to claim 3, wherein the steps of activating and deactivating selectively a user selectable number of subsystems includes deleting at least one subsystem from the total number of subsystems previously defining the corresponding model simulation.

10. A simulation method according to claim 3, wherein the step of activating and deactivating a user selectable number of subsystems includes modifying at least one subsystem of those subsystems previously defining the corresponding model simulation.

11. A simulation method according to claim 3, includes determining a user selectable number of functional operations within each activated subsystem to be displayed.

12. A simulation method according to claim 3, wherein the step of determining includes deactivating a user selectable number of the total number of displayable subsystems.

13. A computer readable article of manufacture comprising:
- a computer useable medium having computer readable program code means embodied in said medium for causing computer means to simulate the functional operations of a given model simulation;
- said computer readable program code means including a plurality of computer readable subsystem program code means each indicative of the functional operation of an individual subsystem forming part of said model simulation;
- each individual one of said plurality of computer readable subsystem program code means having a unique index number assigned thereto for defining the total number of subsystems forming said model simulation and for helping to facilitate the activation and deactivation of the individual subsystems during model simulation;
- one of said computer readable subsystem program code means further including computer readable last control loop program code means for defining an end index number to prevent temporarily said computer means from reading any subsystem program code means embodied thereafter in said medium; and
- said last control loop program code means causing the index number assigned to each computer readable subsystem program code means to be renumbered sequentially commencing with a first index number and terminating with said end index number so that any computer readable subsystem program code means embodied in said medium following said last control loop program code means will not be included in the renumbered sequence and will not be readable by said computer means for model simulation purposes.

14. A simulation system, comprising:
- computer means for receiving information relating to a model simulation;
- a computer useable medium having computer readable program code means embodied in said medium for causing the computer means to simulate the functional operations of said model simulation;
- said computer readable program code means including a plurality of computer readable subsystem program code means each indicative of the functional operation of an individual subsystem forming part of said model simulation;
- each individual one of said plurality of computer readable subsystem program code means having a unique index number assigned thereto for defining the total number of subsystems forming said system to be simulated and for helping to facilitate the activation and deactivation of the individual subsystems during model simulation;
- one of said computer readable subsystem program code means further including computer readable last control loop program code means for defining an end index number to prevent temporarily said computer means from reading any subsystem program code means embodied thereafter in said medium; and
- said last control loop program code means causing the index number assigned to certain ones of said computer readable subsystem program code means to be renumbered sequentially commencing with a first index number and terminating with said end index number so that any computer readable subsystem program code means embodied in said medium following said last control loop program code means will not be included in the renumbered sequence and will not be readable by said computer means for system simulation purposes.

15. A system according to claim 14, wherein said computer means includes monitor means for displaying the functional operation of said model simulation.

16. A system according to claim 14, wherein said computer readable program code means includes default means for simultaneously displaying all of the displayable functional operations of said model simulation.

17. A system according to claim 16, having indexing means for displaying selectively the displayable functional operations embodied within said medium between said first index number and said end index number inclusively.

18. A simulation system according to claim 14, wherein each individual one of said plurality of computer readable subsystem program code means includes a plurality of computer readable component program code means each indicative of a component functional operation to be simulated and forming part of its corresponding subsystem;
- each individual one of said plurality of computer readable component program code means having a unique site number assigned thereto for defining the total number of components forming a corresponding subsystem to be simulated and for helping to facilitate the activation and deactivation of the individual components within the corresponding subsystem during model simulation;
- one of said computer readable component program code means further including computer readable last component program code means for defining a last site number to prevent temporarily said computer means from reading any component code means embodied thereafter in said medium; and
- said last component program code means defining the number of components to be simulated within each individual one of said subsystem during any given simulation.

19. A simulation system according to claim 18, further including toggling means for activating and deactivating selectively desired subsystems of the system for simulation purposes.

20. A simulation system according to claim 19, further including means for adjusting the number of displayable functional operations of said system from a maximum number to a user selected minimum number.

* * * * *